United States Patent [19]

den Hollander et al.

[11] Patent Number: 4,612,568

[45] Date of Patent: Sep. 16, 1986

[54] BURST-TO-LINE-LOCKED CLOCK DIGITAL VIDEO SIGNAL SAMPLE RATE CONVERSION APPARATUS

[75] Inventors: Willem den Hollander, Schlieren; Werner N. Hartmeier, Geroldswil, both of Switzerland

[73] Assignee: RCA Corporation, Princeton, N.J.

[21] Appl. No.: 668,478

[22] Filed: Nov. 5, 1984

[51] Int. Cl.[4] .......................... H04N 9/44; H04N 9/64
[52] U.S. Cl. ........................................ 358/19; 358/25
[58] Field of Search ........................ 358/13, 23, 19, 25

[56] References Cited

U.S. PATENT DOCUMENTS

| | | | |
|---|---|---|---|
| 3,996,605 | 12/1976 | Coffey | 358/8 |
| 4,007,486 | 2/1977 | Inaba et al. | 358/13 |
| 4,015,288 | 3/1977 | Ebihara et al. | 358/19 |
| 4,145,705 | 3/1979 | Yoshinaka | 358/8 |
| 4,214,262 | 7/1980 | Mizukami | 358/19 |
| 4,249,198 | 2/1981 | Ito et al. | 358/13 |
| 4,349,833 | 9/1982 | Clarke | 358/13 |
| 4,376,291 | 3/1983 | Heitmann | 358/320 |
| 4,439,786 | 3/1984 | Claydon et al. | 358/148 |
| 4,443,765 | 4/1984 | Findeisen | 328/55 |
| 4,445,135 | 4/1984 | Heitmann et al. | 358/19 |

OTHER PUBLICATIONS

Stephen Kreinik et al, "Multifunction Digital Video Processor", SMPTE, Digital Video, vol. 3, 1980, pp. 100–105.

Primary Examiner—John W. Shepperd
Attorney, Agent, or Firm—E. M. Whitacre; P. J. Rasmussen; E. P. Herrmann

[57] ABSTRACT

A digital video signal processing system is described wherein analog video signal is sampled by a sampling clock phase locked to burst and the digital video samples are processed with a clock phase locked to horizontal sync. The respective sampling phases of the sampling clock are encoded and concatenated with the digital video samples for purposes of synchronously demodulating the color difference signals of composite video. Burst clock to line locked clock sample conversion is accomplished in a FIFO memory.

12 Claims, 7 Drawing Figures

BURST-TO-LINE-LOCKED CLOCK DIGITAL VIDEO SIGNAL SAMPLE RATE CONVERSION APPARATUS

This invention relates to a digital video signal processing system and more particularly to apparatus for converting video samples synchronized to a burst locked clock to video samples synchronized to a horizontal sync (line) locked clock.

Digital video signal processing systems such as digital TV receivers typically convert analog video signals to digital samples with a sampling clock which is synchronous with the burst component of the video signal. Having the sampling clock, and therefore the digital video samples, synchronous with burst facilitates demodulation of the color component of composite video and color signal processing.

It is desirable for certain receiver enhancements such as double rate scan (progressive scan) to have the samples phase locked to the line frequency. For standard NTSC signals, the burst locked sampling clock is also synchronized to the line frequency. However, burst locked digital video samples of non-standard signals and PAL video signals are not locked to the line frequency.

Thus, there is a need for apparatus to translate or convert burst locked digital video samples to line locked samples. In making the translation, a correspondence between sample phase and line locked clock phase must be maintained if conventional digital color decoding apparatus is to be utilized.

SUMMARY OF THE INVENTION

The present invention is a digital video signal sample rate conversion apparatus, including a memory device having storage sites which may be independently addressed for writing into and reading from respective ones of the storage sites. Burst locked samples are written into consecutively addressed storage sites responsive to a burst locked clock. Independently samples are read from consecutively addressed storage sites responsive to a line locked clock. Means are provided to the addressing circuitry or to the color decoder to maintain proper correspondence of the phase of the line locked clock to the burst phase at which the respective video samples were sampled.

DETAILED DESCRIPTION

Figure 1:
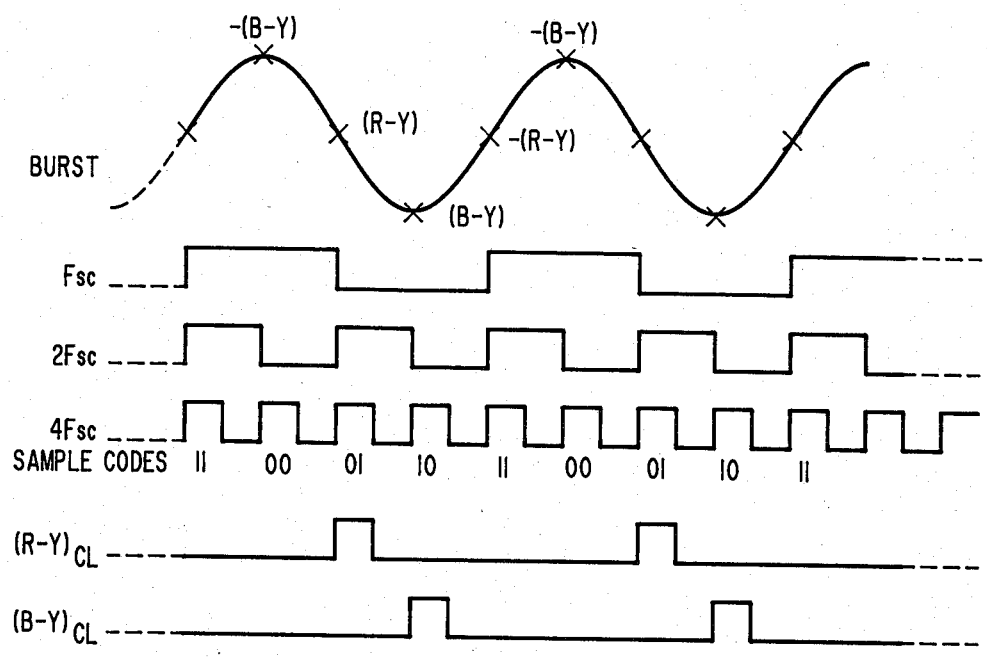
FIG. 1 is a waveform diagram showing a portion of color burst signal and clocking signals phase/frequency locked thereto.

FIG. 1 shows a portion of a color burst reference signal (BURST) and the relationship of a phase locked, four times subcarrier clock ($4F_{sc}$). The x's on the burst waveform indicate successive points at which the burst signal may be sampled responsive to the $4F_{sc}$ clock. The sampling points indicated are chosen to simplify color signal decoding. The burst frequency is 3.58 MHz (NTSC) and four samples are taken per cycle.

Color burst corresponds to a $-(B-Y)$ color difference signal and one of the sampling points occurs at the peak of burst. The nextmost three successive sampling points occur at 90° phase intervals. As is known by digital TV system designers, these latter three sampling points correspond to $(R-Y)$, $(B-Y)$ and $-(R-Y)$ color difference samples respectively.

Having samples successively corresponding to $-(B-Y)$, $(R-Y)$, $(B-Y)$ and $-(R-Y)$ samples permits separation of the quadrature components of digital chrominance signal by demultiplexing the interleaved samples. Alternatively, quadrature component separation and demodulation may be achieved by selecting only two of each sequence of four interleaved samples. For example, a demultiplexer which selects only the $(R-Y)$ samples and the $(B-Y)$ samples and produces them on respective output ports yields demodulated $(R-Y)$ and $(B-Y)$ color difference signals. The $(R-Y)_{CL}$ clock and the $(B-Y)_{CL}$ clock shown in FIG. 1 may be used to implement such demodulation. Note that in order to effect this type of simplified chrominance signal demodulation, the phase of the clock utilized for demodulation must remain in a fixed relation to the sampling clock.

In a digital TV system which samples signal with a burst locked clock and then processes the samples with a line locked clock which is asynchronous with the burst locked clock there is little or no phase coherence between the sample phases and the processing clock phases. In general, this is of no consequence in processing the liminance component of video signals. However, it precludes, for example, the simplified demodulation of the chrominance component of video signals. However, the processing circuitry which operates with the asynchronous clock can, in general, be organized with conventional color signal processing circuitry if the samples are provided with sample clock phase information or if the burst clock-to-asynchronous clock conversion apparatus provides sample phase to clock phase coherence. (Hereafter the asynchronous clock will be referred to as the line locked clock.)

Figure 2:
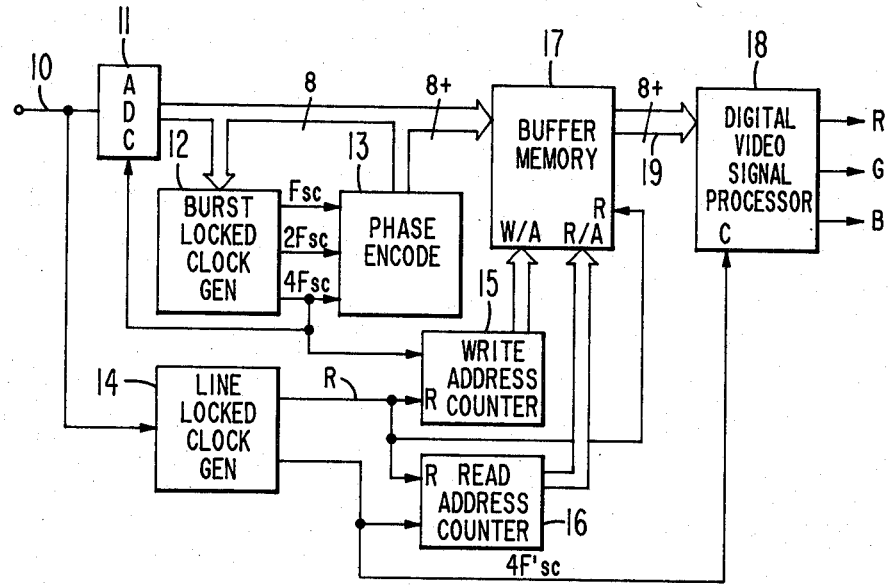
FIGS. 2, 5 and 6 are block diagrams of clock conversion systems embodying the present invention in a video signal processing system.

FIG. 2 illustrates a portion of a video signal processing system which converts analog video signal to pulse code modulated (PCM binary) format synchronously with sampling clock signals phase locked to color burst and processes the PCM codewords in synchronism with clock signals phase locked to e.g. the horizontal synchronization component of the video signal. In this system the sampling clock phase is encoded. Clock phase codewords are concatenated with the PCM video sample codewords for use by the system to relate sample phase to the processing system clock phase.

In the following figures, narrow arrows generally indicate single conductor connections unless depicted with a slash and a number adjacent the slash to indicate that number of parallel connections. Wide arrows designate multiwire busses. In FIG. 2, baseband composite video signal from e.g. a tuner/detector is applied at terminal 10 to the analog input terminal of analog-to-digital converter (ADC) 11. ADC 11 responsive to a sampling clock from a burst locked clock generator 12 produces PCM representations of the analog signal applied to its input. The PCM samples from ADC 11 occur at four times color subcarrier rate and are phase locked to the subcarrier such that samples of the chroma component of the composite video occur in e.g. repeating interleaved sequences $(R-Y)_n$, $(B-Y)_n$, $-(R-Y)_n$ and $-(B-Y)_n$.

Samples from ADC 11 are applied to the burst locked clock generator 12, which develops the 4 times subcarrier sampling clock $4F_{sc}$ and additional clock signals $F_{sc}$ and $2F_{sc}$.

The three clock signals generated by clock generator 12 are applied to a sample clock phase encoder 13. Phase encoder 13 develops binary codewords corresponding to the phase of the current sampling clock cycle. For example, sampling clock binary codes corresponding to samples taken along the $-(B-Y)$, $(R-Y)$, $(B-Y)$ and $-(R-Y)$ signal axis may comprise the codewords 00, 01, 10 and 11 respectively. This correspondence is indicated in FIG. 1.

Figure 3:
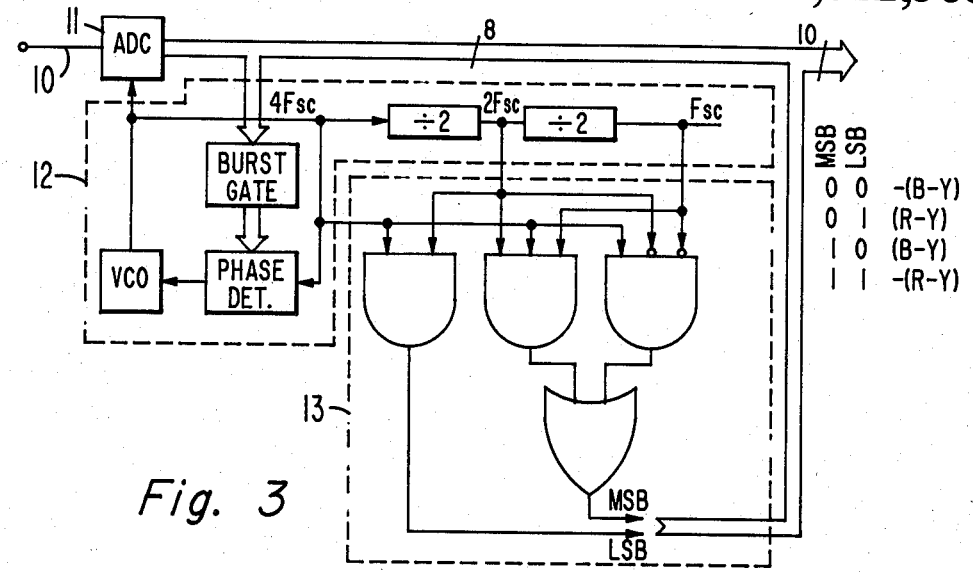
FIG. 3 is a block diagram of a clock phase code generating circuit as for use in the FIGS. 2, 4 and 6 systems.

FIG. 3 illustrates in block diagram form one embodiment of the burst locked clock generator 12 and a logic schematic diagram of the clock phase encoder 13. The burst locked clock generator is of known design. In FIG. 3, the ADC is part of the phase locked loop and, therefore, the phase detector is a binary device. It will be readily appreciated that the phase locked loop may be arranged to be responsive to the analog signal at terminal 10.

The clock phase encoder shown in FIG. 3 is one example of circuitry which may be employed for this function. The AND and OR gates of phase encoder 13 reduce the $4F_{sc}$, $2F_{sc}$ and $F_{sc}$ clock waveforms of FIG. 1 to the codewords listed in the figure. Depending on the input timing of buffer memory 17, it may be desirable to interpose a latch between the output of phase encoder 13 and memory 17 to sustain the clock phase codes for an entire $4F_{sc}$ clock period.

Note that the $F_{sc}$ and $2F_{sc}$ clock waveforms contain sufficient information to develop sequences of four codewords. For example, if the codewords 10, 01, 00 and 11 are selected to correspond to samples $-(B-Y)$, $(R-Y)$, $(B-Y)$ and $-(R-Y)$ respectively, the $F_{sc}$ clock signal and the $2F_{sc}$ clock signal may be utilized as the MSB and LSB clock phase code bits respectively. Selection of the clock phase codewords is totally arbitrary and only impacts on the design of the decoder that ultimately uses the codewords.

Referring again to FIG. 2, PCM samples from ADC 11 are applied to a buffer memory 17 which effects conversion of the burst locked samples to the line locked sample rate.

Buffer memory 17 is one of the class of memory systems generically known as a first-in first-out or FIFO memory. An example of a FIFO for use in the FIG. 2 circuit will be described hereinafter with reference to FIG. 7.

Buffer memory 17 is capable of writing data into storage locations at one rate and simultaneously reading data from storage locations at a second rate asynchronous to the first rate.

Write address counter 15, responsive to the $4F_{sc}$ sampling clock from the burst locked clock generator 12, develops address codewords synchronous with the occurrence of PCM sample codewords from ADC 11 and the sampling clock codewords from encoder 13. The address codewords from write address counter 15 are applied to the write address input port W/A of buffer memory 17 for allocating respective PCM video samples to particular storage locations in the memory.

Read address codewords, developed in a read address counter 16, are applied to a read address input port R/A of buffer memory 17. Responsive to the read address codewords, buffer memory 17 outputs the concatenated PCM video-clock phase codewords at a rate synchronous with the generation of the read address codewords.

The read address counter develops the read address codewords responsive to a clock signal $4F_{sc}'$ from the line locked clock generator 14. The frequency of the clock signal $4F_{sc}'$ is assumed to be substantially equal to the frequency of the sampling clock $4F_{sc}$. (If the incoming video signal is a PAL signal, the frequency of the $4F_{sc}$ is 17.734475 MHz and the frequency of the $4F_{sc}'$ clock is 17.734375 MHz.)

Alternatively, the sample rate from ADC 11 may be transcoded to a lower rate before applying the samples to the buffer memory 17. The new lower sample rate $F_{sample}$ will be locked to the burst clock. To accommodate such lower rate samples, the read clock $F_{sample}'$ will be substantially equal to the $F_{sample}$ rate.

The line locked clock generator 14 responds to the horizontal synchronizing components of the analog composite video signal at terminal 10 to develop a clock signal $4F_{sc}'$ substantially equal to the $4F_{sc}$ clock signal and phase locked to the horizontal synchronization component of the video signal. Clock generator 14 consists of conventional phase locked loop circuitry known to those skilled in the art of video signal processing circuitry. It is noted that, for certain applications, the $4F_{sc}'$ clock may be derived from a source independent of the video signal at terminal 10.

Clock generator 14 also develops a reset signal, R, which periodically resets the address counters 15 and 16 and the buffer memory 17. The frequency of the reset pulses depends upon the expected frequency difference between clocks $4F_{sc}$ and $4F_{sc}'$ and the size of the buffer memory. For small differences in frequency, the reset frequency may correspond to the vertical rate while for greater frequency differences and/or small memory size the reset frequency may correspond to the horizontal rate. Resetting is preferably performed during a blanking interval so that no video information is lost by the reset function.

Video samples from buffer memory 17 are applied to the video signal processing circuitry 18 wherein they are synchronously processed at the $4F_{sc}'$ clock rate.

Figure 4:
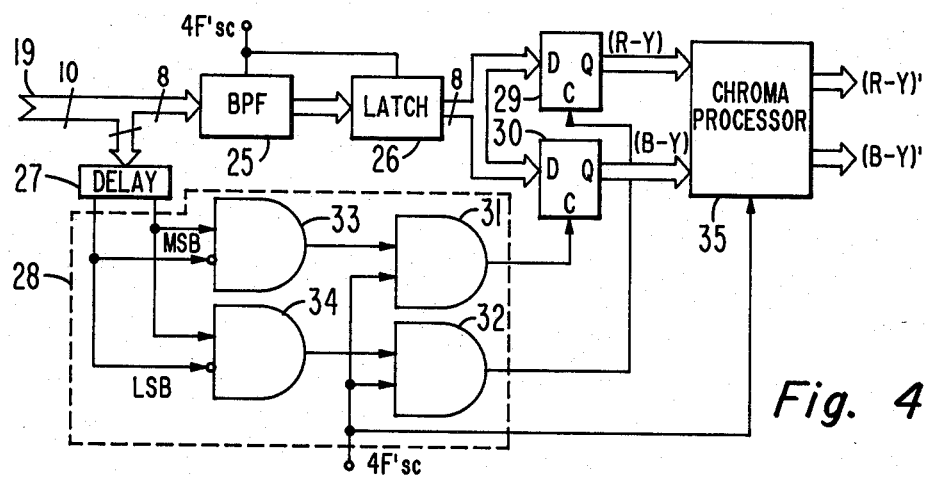
FIG. 4 is a block diagram of a sampled data color demodulator for use with video samples having clock phase codes concatenated therewith.

Except for color signal processing, digital video signal processing is generally insensitive to the phase of the sampling clock. The color signal processing is also insensitive to clock phase except for separation and demodulation of the quadrature related color difference signals. FIG. 4 illustrates a color difference signal separator and demodulator which may be included in the digital video signal processor 18 of FIG. 2.

In FIG. 4 concatenated samples from buffer memory 17, on bus 19, are segregated into video samples which are applied to a digital bandpass filter 25 and into sample clock phase codes which are applied to a delay element 27. The digital bandpass filter 25 may be a finite impulse response filter arranged to pass the portion of the frequency spectrum occupied by the chrominance component of composite video signal to the substantial exclusion of the luminance component. Bandpass filter 25 is sequenced by the $4F_{sc}'$ clock signal and, thus, operates synchronously with the video samples provided by memory 17.

Chrominance samples from filter 25 are clocked into latch 26 by the $4F_{sc}'$ clock. Output samples from latch 26 are applied in parallel to the data input ports, D, of latches 29 and 30. Latches 29 and 30 are conditioned to input data responsive to control signals from clock phase decoder 28 applied to their respective clock input terminals, C. For the decoder illustrated in FIG. 4, latch 29 is conditioned to input samples of (R−Y) phase only and latch 30 accepts samples of (B−Y) phase only. Thus, output sample sequences from latches 29 and 30 represent demodulated (R−Y) and (B−Y) color difference signals respectively. These colors difference signals are applied to chroma processor 33 for further processing such as saturation control, etc.

Delay element 27 coupled between bus 19 and decoder 28 provides compensating delay to properly align the control signals from decoder 28 with the samples provided by latch 26.

The illustrated decoder 28 is arranged to recognize the sampling clock phase codewords illustrated in FIG. 1. In particular, the (R−Y) and (B−Y) sample phase codes are respectively 01 and 10. AND gate 34 outputs a logic one only when the logic states applied to its two input terminals is a 01 code and AND gate 33 outputs a logic one only when the logic states on its two input terminals is a 10 code. The output terminals of AND gates 33 and 34 are respectively coupled via AND gates 31 and 32 to the clock input terminals of latches 30 and 29. A $4F_{sc}'$ clock signal is applied to respective second input terminals of AND gates 31 and 32 to synchronize the decoded output signals from AND gates 33 and 34 with the clock signals applied to bandpass filter 25, latch 26 and chroma processor 35.

If separation but not demodulation of the color difference signals is desired, the sample clock phases may be encoded with a single bit codeword corresponding to the logic states of the $2F_{sc}$ clock. In this instance the decoder reduces to apparatus for applying the phase codeword and its complement respectively to the clock input terminals of latches 29 and 30.

Figure 5:
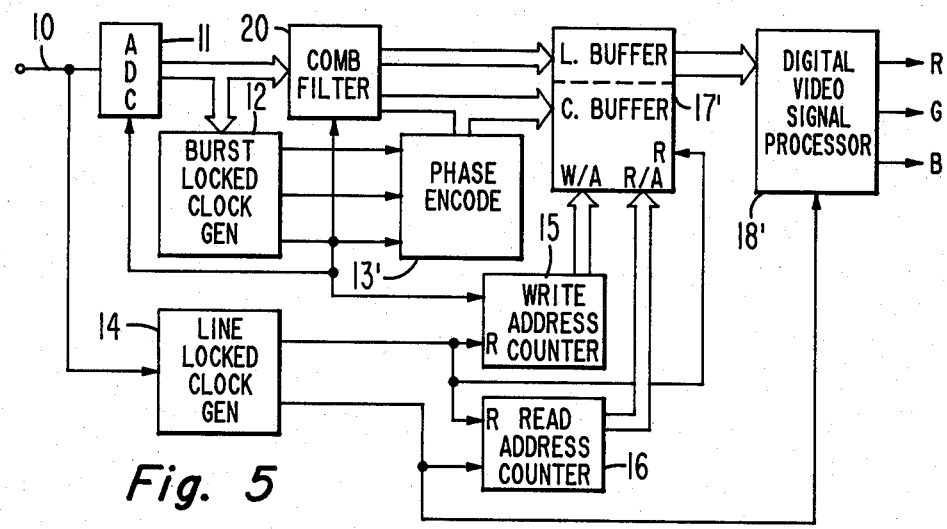

FIG. 5 is an alternative arrangement of the FIG. 2 clock conversion system for use with a comb filter. Elements of FIG. 5 designated with the same numerals as the FIG. 2 elements perform like functions.

Comb filters require samples which occur in precise line sequences. In general, the response of a comb filter will be deleteriously affected if samples are dropped due to a clock rate conversion process. Therefore, comb filtering should occur ahead of the clock rate conversion.

However, it the addressing system is reset on a line-by-line basis so that particular samples are aligned line-to-line, a comb filter may be positioned after the memory.

The comb filter provides separated chrominance and luminance signals requiring that the buffer memory 17' which follows the comb filter contain parallel memory sections to accommodate the two signals. The parallel memories may, however, be controlled in parallel by the same write and read address codes.

The construction of clock phase encoder 13' depends on the particular comb filter arrangement employed. If the chrominance signal produced by comb filter 20 is in phase with the chrominance component of composite video applied to the input port of comb filter 20, clock phase encoder 13' will be identical to clock phase encoder 13. Alternatively, if comb filter 20 produces a chrominance signal which is, e.g. 180° out of phase with the input chrominance component, encoder 13' must be arranged to accommodate the difference. For example, the encoder may be arranged to generate the codewords 11, 00, 01 and 10 for the input sample phases (R−Y), (B−Y), −(R−Y) and −(B−Y) respectively, to compensate for the 180° phase difference.

Figure 6:
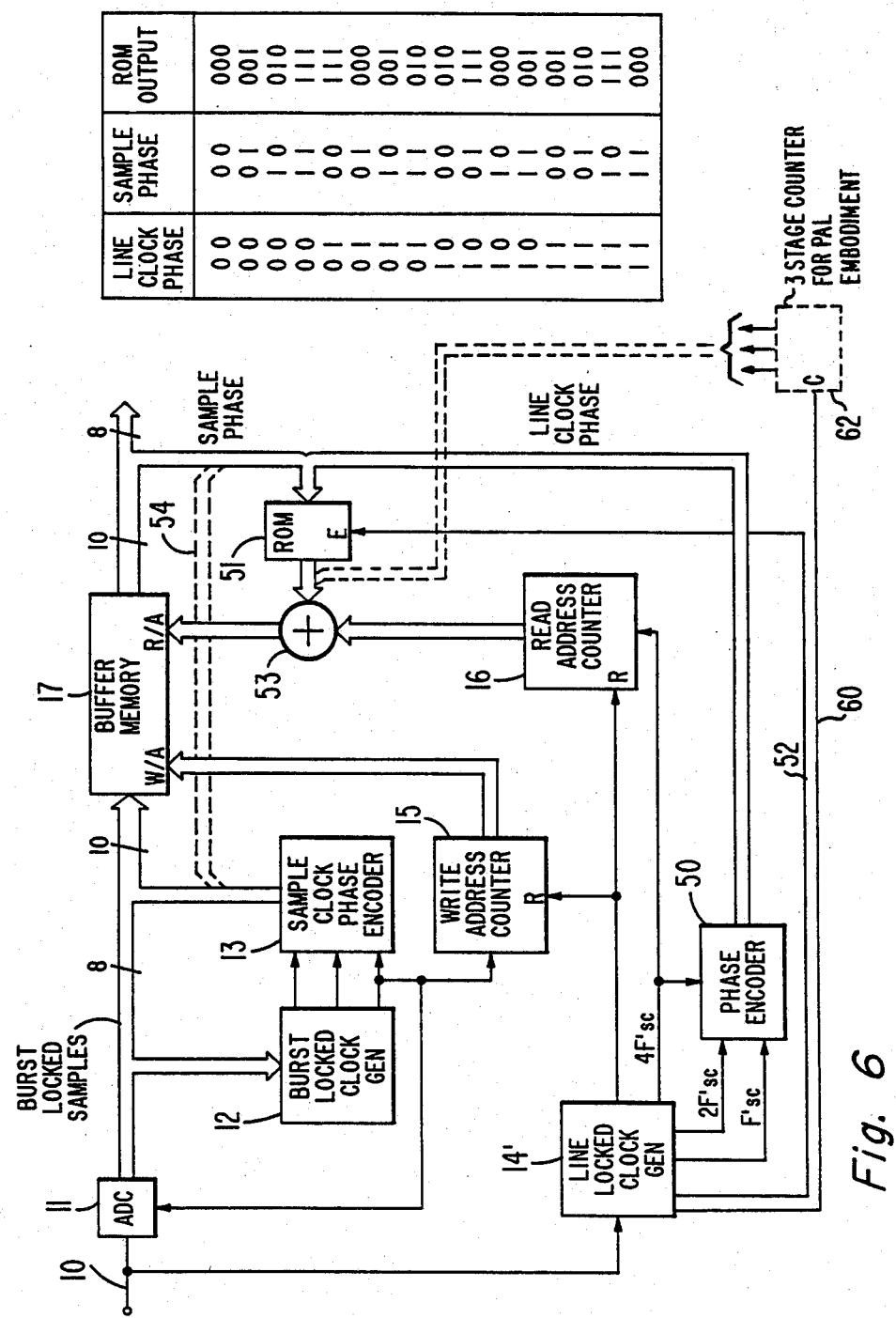

FIG. 6 is a further embodiment wherein samples output by the buffer memory are appropriately phased with the processing clock $4F_{sc}'$ for subsequent processing by conventional digital video processing circuits. Elements of FIG. 6 designated with the same numbers as FIG. 2 elements perform like functions.

In FIG. 6, the line locked clock generator 14' is configured to produce the additional clock signals $2F_{sc}'$ and $F_{sc}'$. These clock signals and the $4F_{sc}'$ clock signal are applied to a clock phase encoder 50 which may be similar to encoder 13 to develop codewords indicative of the current phase of clock $4F_{sc}'$ as it is employed in subsequent video processing circuitry (not shown). The clock signals developed by generator 14' are phased to correspond to the line-to-line relationship of the color subcarrier, e.g. for an NTSC system the $F_{sc}'$ clock has a 180° relationship from line-to-line. The phase of the $4F_{sc}'$ clock is compared with the sampling clock phase of the samples output by buffer memory 17. If the phases differ, the read clock address is adjusted so that the sample read from memory 17 is one which was sampled by a sampling clock phase $4F_{sc}$ which is the same as the current line locked clock phase.

In FIG. 6, the sample phase and $4F_{sc}'$ clock phase comparison is performed by the ROM 51. The sample phase codeword of the current sample output by memory 17 and the $4F_{sc}'$ phase codeword from encoder 50 are combined to form address codewords applied to ROM 51. ROM 51 is programmed to produce the appropriate read address correction value for memory 17. The correction value is applied to adder 53 wherein it is added/subtracted from the read address provided by read address counter 16. The output of adder 53 is then applied to the read address input port R/A of memory 17.

A table of correction values programmed into ROM 51 is shown for all combinations of sample and clock phase codes. This table assumes that buffer memory 17 contains eight memory locations designated zero through seven. The write address codes from address counter 15 and the read address codes from counter 16 continuously recycle through the address values zero to seven. Thus, if the phase of the line locked clock $4F_{sc}$ slips relative to the sampling clock, it is a simple matter to determine which memory location in buffer memory 17 contains the sample having the same phase as the current $4F_{sc}'$ clock phase. The illustrative correction values programmed in ROM 51 are selected so that the sample having the desired sampling phase nearest the erroneous sample currently output by memory 17 is selected.

ROM 51 may be programmed with alternative correction values. For example, the correction values may be selected to always increase the read address codeword when the phase of the $4F_{sc}'$ clock slips behind the sample phase code and to decrease the read address codeword when the phase of the $4F_{sc}'$ clock advances ahead of the sample phase code.

Preferably, ROM 51 will be conditioned to correct the read addresses during video signal intervals when no video information is present, i.e. during horizontal blanking periods. This may be accomplished by generating an appropriate enable signal in clock generator 14' and applying it to an enable input to ROM 51. In this instance, the same correction value will be applied to all read addresses between occurrences of the enabling signal. Note that the enabling signal may be at a rate different from the reset control applied to the address counters.

It will be readily appreciated that address corrections may be applied to the write address codewords from counter 15 rather than to read address codewords from counter 16, or a combination of corrections to both the read and write codewords. In addition, address correction may be effected by selectively inhibiting or augmenting the clock pulses input to the read and/or write address counters.

An alternative arrangement of the FIG. 6 system wherein the buffer memory capacity is an integral multiple of the number of sampling phases may have the sampling clock phase codes applied directly from encoder 13 to the address input of ROM 51. This is indicated by the bus 52 drawn with dashed lines.

In a further embodiment, where it is desired to convert burst locked samples of a standard PAL video signal to line locked samples wherein the line locked clock $4F_{sc}'$ contains exactly two less pulses per vertical interval than the burst locked clock, may comprise circuitry which adds two (modulo 8 for an 8 stage buffer memory) to adder 53 during each vertical interval. This circuitry may consist of a three stage binary counter which is clocked twice during each vertical interval. The three output signals from the three stages binary will provide the requisite correction codes. The three stage counter is illustrated in phantom lines as element 62 in FIG. 6. The counter is driven by a signal on connection 60 from clock generator 14', which signal is in the form of, for example, a burst of two $4F'_{sc}$ clock pulses during each vertical blanking period.

Figure 7:
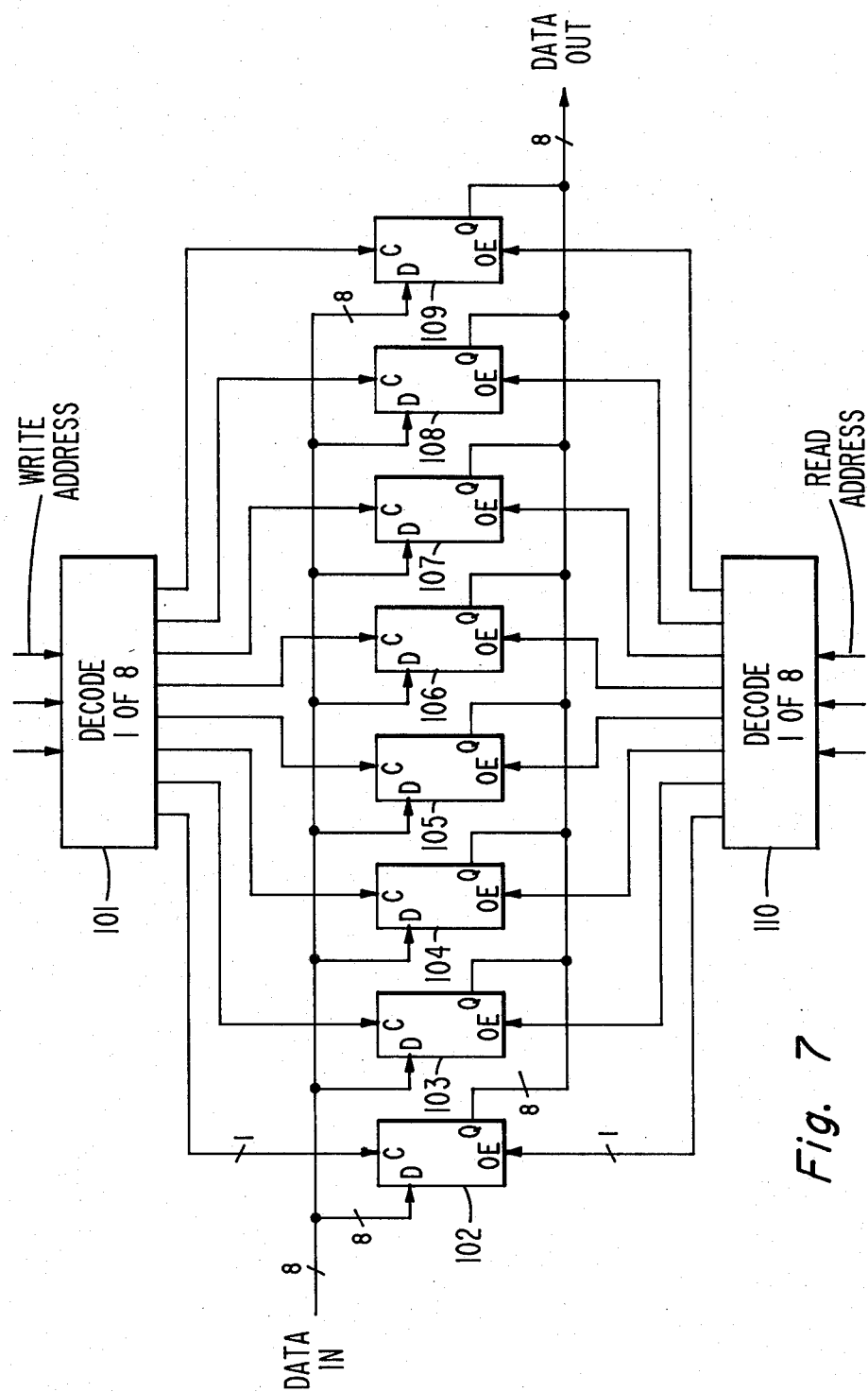
FIG. 7 is a block diagram of a buffer memory for use with the FIGS. 2, 4 and 6 systems.

FIG. 7 is an illustrative example of a buffer memory for use in the aforedescribed systems. This memory is a parallel-in-parellel-out FIFO memory. In the figure, input samples available on the DATA IN bus are applied in parallel to the data input ports, D, of latches 102-109. Respective input samples are loaded in succession into respective latches 102-109 responsive to latching signals from decoder 101 which input enables one latch per sample period. For monotonically increasing write address values, decoder 101 successively enables each of the latches and then recycles back to the first latch, etc.

The output ports of latches 102-109 are connected in parallel to the output port DATA OUT. The respective latch output ports are three-state outputs so that only the latch 102-109 receiving an output enable pulse provides data to the DATA OUT port. The latches 102-109 are output enabled responsive to the one-of-eight decoder 100, one per sample period. Decoder 110 sequences through the respective latches responsive to binary read address values provided by the read address counter 111. Decoders 101 and 110 may be of the type exemplified by the MSI integrated circuit SN74LS138. Latches 102-109 may be of the type exemplified by the MSI integrated circuit SN74LS374. It is noted that the SN74LS374 is an eight-bit device, however, if more data bits are required, additional devices may be paralleled with each of the latches 102-109 to accommodate the additional data bits.

What is claimed is:

1. A video signal processing system for processing composite video signal including a burst reference component and a horizontal synchronizing component, comprising:

means responsive to said burst reference component for developing a sampling clock signal phase locked thereto;

a sampling clock phase encoder, responsive to said means for developing the sampling clock signal, for developing codes designating respective sampling phases of said sampling clock signal;

a source of digital video samples, said digital video samples having predetermined phase relationships with said sampling clock;

means responsive to said horizontal synchronizing component for developing a line locked clock phaselocked to said horizontal synchronizing component and having a frequency substantially equal to the frequency of said sampling clock signal;

memory means responsive to said sampling clock signal for storing said digital video samples and associated sampling clock phase codes, and responsive to said line locked clock for outputting said digital representations and associated sampling clock phase codes asynchronously with said sampling clock; and utilization means coupled to said memory means for processing said digital video samples and responsive to said sample clock phase codes for maintaining a phase coherence between said samples and said line locked clock.

2. The system set forth in claim 1 wherein said memory means includes:

a FIFO memory having a data input port coupled to said source and said sampling clock phase encoder, having a data output port and having respective read and write address input ports;

a write address counter coupled to said sampling clock signal for developing a recycling sequence of successive write address codes; and a read address counter coupled to said line locked clock for developing a recycling sequence of successive read address codes.

3. The system set forth in claim 1 wherein said source is an analog-to-digital converter and the memory means is coupled thereto by a comb filter.

4. The apparatus set forth in claim 1 wherein said utilization means includes means responsive to said sampling clock phase codes for demodulating a component of said digital representations of said composite signal.

5. A video signal processing system for processing composite video signal including a color component, said video signal in sampled data format and sampled synchronously with said color component at regularly recurring phases of said color component, comprising:

a source of sample clock signal which is synchronous with said video signal samples;

means coupled to said source of sample clock signal for providing sample clock digital codes corresponding to respective sampling phases of said video samples;

a source of processing clock signal having a frequency substantially equal to the frequency of said sample clock signal and asynchronous therewith;

memory means having an input port for applying said sample data video signal and said sample clock digital codes, for storing said video signal and respective associated digital codes synchronously with said sample clock signal, and for reading said stored video signal and associated digital codes synchronously with said processing clock signal, wherein said storing and reading operations occur concurrently.

6. The system set forth in claim 5 further including utilization means coupled to said memory means and responsive to said digital codes for demodulating a component of said digital representations of said composite video signal.

7. The system set forth in claim 5 wherein said composite video signal includes a horizontal synchronizing component and said source of processing clock signal is responsive to said horizontal synchronizing component and develops said processing clock signal phase locked to said horizontal synchronizing component.

8. The system set forth in claim 5 further including:
means responsive to the sample clock digital codes and said processing clock for altering the sequence of reading data stored in said memory so that the sample clock phase of the video sample currently read from memory corresponds to the current phase of the processing clock signal.

9. The apparatus set forth in claim 8 wherein said memory means includes:
a FIFO memory having a data input port coupled for applying said video samples, a data output port, a read address input port and a write address input port;
means coupled to said write address input port and responsive to said sample clock signal for developing recycling sequences of write address codes;
means responsive to said processing clock signal for developing recycling sequences or read address codes, which read address codes are applied to said read address input port and wherein said means for altering the sequence of reading said digital representations effects a change in the normal sequence of said recycling sequences of write address codes.

10. The system set forth in claim 9 including an adder coupled to said means for developing read address codes for adding a number to the read address codes developed, and thereby to change the normal sequence of read address codes, and wherein said number is provided by said means responsive to said sample clock digital codes and said processing clock.

11. A video processing system for processing a composite video signal including a burst reference component and a horizontal synchronizing component, comprising:
means responsive to said burst reference component for developing a sampling clock signal phase locked thereto;
an analog-to-digital converter responsive to said sampling clock signal for developing digital representations of said composite video signal;
means responsive to said horizontal synchronizing component for developing a processing clock signal phase locked thereto and having a frequency substantially equal to said sampling clock signal;
memory means coupled to said analog-to-digital converter and said sampling clock signal for sequentially storing said digital representations synchronously with said sampling clock signal, and responsive to said processing clock signal for sequentially reading said digital representations from memory synchronously with said processing clock signal, wherein storing into and reading from memory occur concurrently; and
means for advancing the read sample sequence by two samples for each field of composite video signal.

12. The system set forth in claim 11 wherein the memory means includes:
a FIFO memory having a data input port coupled to said analog-to-digital converter, a data output port, a read address inputport and a write address input port;
means coupled to said write address input port and responsive to said sampling clock signal for developing recycling sequences of write address codes;
means responsive to said processing clock signal for developing recycling sequences of read address codes, which read address codes are applied to said read address input port and wherein said means for advancing the read sample sequence includes an adder coupled to said means for developing read address codes for adding the value, two, to the current read address codes for each field of composite video.

* * * * *